United States Patent [19]

Kervistin et al.

[11] Patent Number: 4,500,143
[45] Date of Patent: Feb. 19, 1985

[54] MEANS FOR CONTROLLING CLEARANCE IN AN INTERSHAFT BEARING JOURNAL OF A MULTI-SPOOL GAS TURBINE

[75] Inventors: Robert Kervistin, Le Mee Sur Seine; Alain M. J. Lardellier, Melun; Georges Mazeaud; Francois E. G. Crozet, both of Yerres, all of France

[73] Assignee: S.N.E.C.M.A., Paris, France

[21] Appl. No.: 452,131

[22] Filed: Dec. 22, 1982

[30] Foreign Application Priority Data

Dec. 22, 1981 [FR] France .................. 81 23900

[51] Int. Cl.³ .................. F16C 37/00; F01D 25/12; F02C 7/06
[52] U.S. Cl. .................. 384/467; 184/6.11; 415/180
[58] Field of Search .............. 308/184 R, 187, 189 R, 308/207 R, 216, DIG. 15, DIG. 14; 184/6.11; 415/110, 111, 112, 113, 175, 180; 384/313, 316, 384/317, 397, 398; 60/39.08

[56] References Cited

U.S. PATENT DOCUMENTS

| | | | |
|---|---|---|---|
| 2,652,294 | 9/1953 | Islip .................. | 384/321 |
| 2,866,522 | 12/1958 | Morley et al. .................. | 184/6.11 |
| 3,269,786 | 8/1966 | Diver et al. .................. | 308/187 |
| 3,393,024 | 7/1968 | Rhodes .................. | 384/316 |
| 4,265,334 | 5/1981 | Benhase, Jr. .................. | 184/6.11 |
| 4,378,197 | 3/1983 | Cattaneo et al. .................. | 415/175 |

FOREIGN PATENT DOCUMENTS

| | | |
|---|---|---|
| 1384980 | 1/1964 | France . |
| 2001380 | 9/1969 | France . |
| 2208050 | 6/1974 | France . |
| 2484574 | 12/1981 | France . |
| 803050 | 10/1958 | United Kingdom . |

Primary Examiner—Stuart S. Levy
Assistant Examiner—David Werner
Attorney, Agent, or Firm—Oblon, Fisher, Spivak, McClelland & Maier

[57] ABSTRACT

A clearance control device in an inter-shaft turbojet engine bearing journal placed between a high pressure trunnion and a low pressure trunnion and including inserted between an inner ring and an outer ring, the high pressure trunnion including a series of longitudinal grooves and a series of longitudinal holes which are supplied with oil from an intake and an annular collector in the low pressure trunnion, from which the oil moves by centrifugation through radial holes into an annular recess in the downstream tightening nut of the outer ring, which in turn communicates with the grooves through holes formed in the nut. Clearance in the bearing journal is controlled by cooling the high pressure trunnion at the maximum operating speeds of the turbine via circulating oil. By virtue of an appropriate circuit, the oil supplied by the collector lubricates the bearing and cools the roller bearing journal.

9 Claims, 7 Drawing Figures

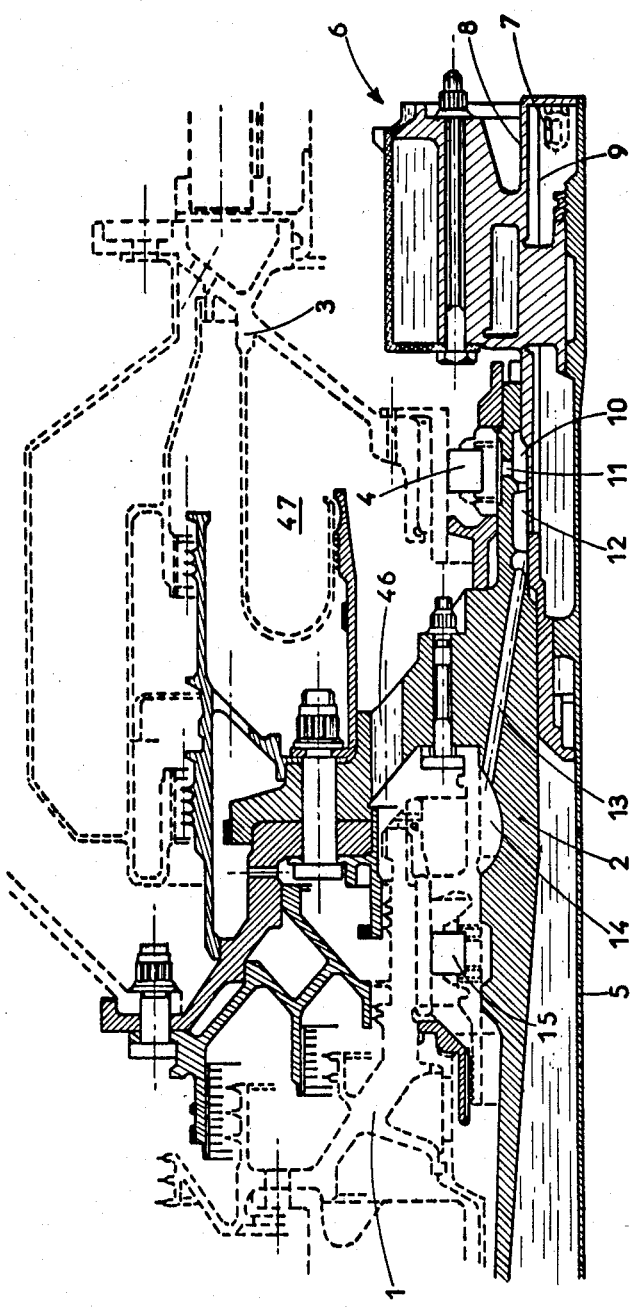
FIG:1

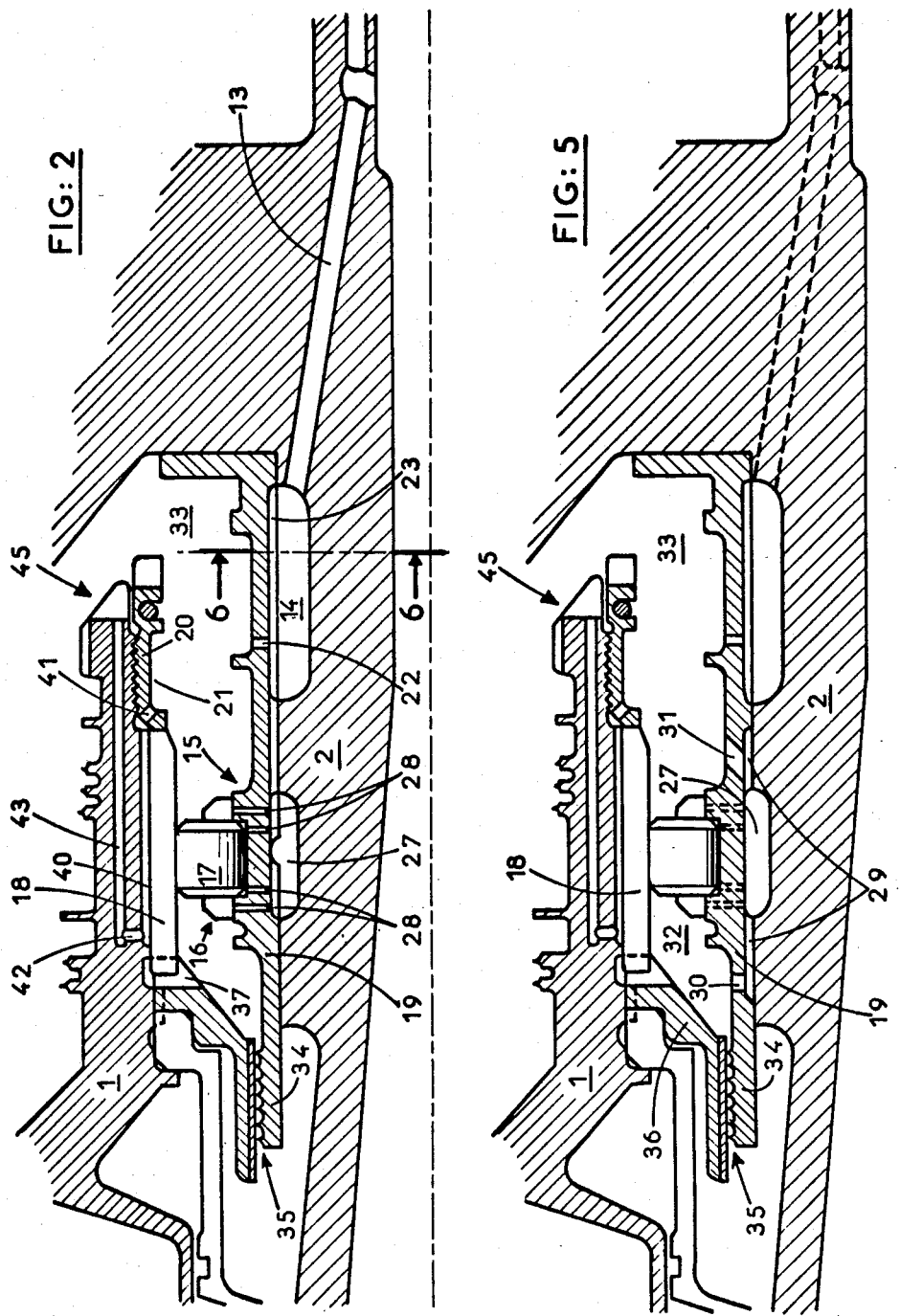

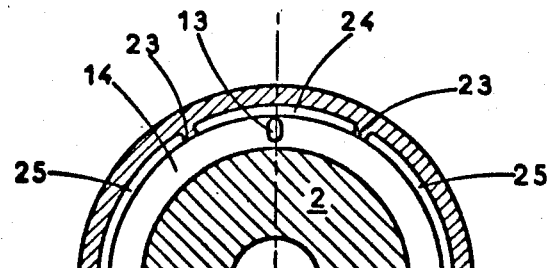
FIG: 6
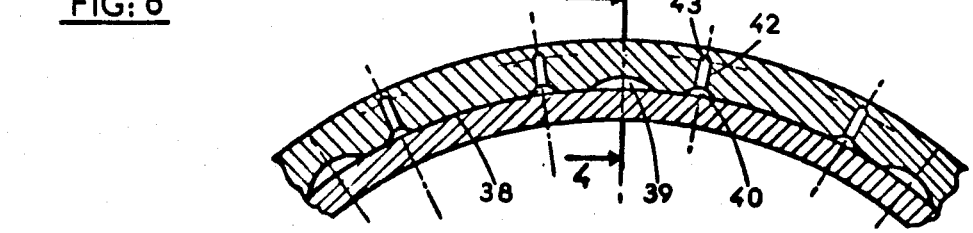
FIG: 3
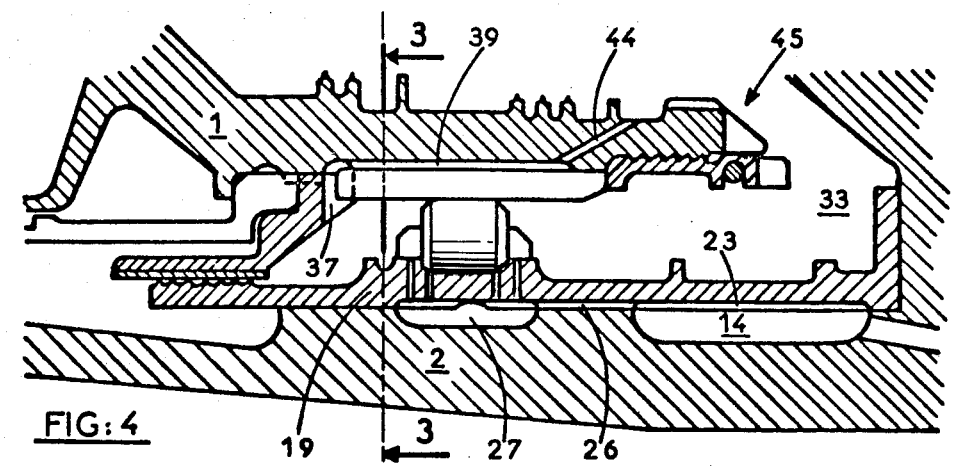
FIG: 4
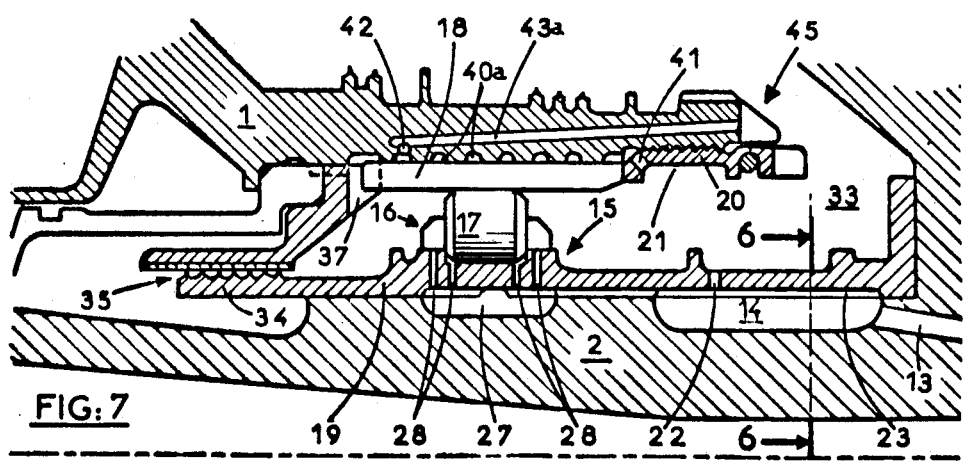
FIG: 7

MEANS FOR CONTROLLING CLEARANCE IN AN INTERSHAFT BEARING JOURNAL OF A MULTI-SPOOL GAS TURBINE

BACKGROUND OF THE INVENTION

1. Field of the Invention

The present invention concerns means for controlling clearance in an inter-shaft bearing journal in a multi-spool gas turbine.

2. Description of the Prior Art

Multi-spool gas tubines have a bearing journal which supports one revolving shaft in relation to another, and which generally comprises a roller bearing inserted between an outer ring mounted upon the first shaft and an inner ring mounted upon the second. More precisely, the first, outer shaft may consist of the trunnion of the shaft line of the high pressure stage, while the second, inner shaft consists of the trunnion of the shaft line of the low pressure spool. In order to obtain satisfactory performance from bearing journals of this type, the most effective arrangements possible must be sought for lubricating and cooling the roller bearing.

French Pat. No. 2,001,380, filed Jan. 24, 1969, provides several solutions. This patent relates to a gas turbine engine in which one journal bearing supports a compressor shaft in relation to a stationary journal box, while another journal bearing supports the same shaft in relation to a short shaft carried by the fan shaft. Lubricant is fed from a common source to three groups of axial grooves located under the inner ring of the roller bearing and distributed to the various upstream and downstream zones through radial drill holes in said inner ring. The second journal bearing is supplied with lubricant that has passed through some of the grooves of the first journal bearing.

French Pat. No. 2,208,050, filed Nov. 23, 1973, provides another illustration of the solutions being used. As described in this patent, the inner surface of the tightening nut of the inner ring of a journal bearing's roller bearing comprises an annular recess that is supplied with oil. The oil is then distributed over the inner ring in order to lubricate and cool the roller elements. From here, it passes over the outer ring.

These earlier methods of setting up bearing journals are not, however, always entirely satisfactory, leaving certain problems unresolved. This appears particularly in applications to multi-spool gas turbines, which demand a higher level of performance and involve severe conditions of use. Thus, the environment of the bearing journal is submitted to centrifugal and thermal expansions and, in the application hereabove, where a bearing journal in a multi-spool gas turbine is mounted between a trunnion of the shaft line of the high pressure spool and a trunnion of the shaft line of the low pressure spool, considerable clearance has been observed in operation at maximum r.p.m.s, despite tight mounting and application of known techniques for lubricating and cooling the journal's roller bearing.

Other technical solutions applicable to bearing journals of the type being considered and known to men skilled in the art also allows vibration damping of shafts and roller through the use of a pressurized film of oil formed over a bearing ring. But these solutions also turn out to be inadequate in avoiding the appearance of the excessive operating clearance that is so damaging to the mechanical upkeep of these bearing journals.

SUMMARY OF THE INVENTION

In order to avoid the disadvantages of known solutions while retaining the benefits of the prior art, as noted above, the purpose of the invention is to construct an inter-shaft bearing journal for multi-spool gas turbine, equipped with means for controlling clearance so as to reduce said clearance in the bearing journal during operation. This is obtained through the use of a bearing journal equipped with clearance control means conforming to the teachings of the invention, for a multi-spool gas turbine of the type having a first, outer revolving shaft consisting of the trunnion of the spool line of the high pressure stage, in relation to a second, inner shaft consisting of the trunnion of the shaft line of the low pressure spool, and comprising a roller bearing inserted between an outer ring mounted directly upon the first shaft and an inner ring mounted on the second. The means for controlling clearance in this bearing journal are characterized in that the high pressure trunnion shows a series of grooves supplied with cold oil which communicate with a series of longitudinal drill holes in which the cooling oil circulates.

By action of these means, the outer ring of the roller bearing and its recesses in the high pressure trunnion are actively cooled by the internal circulation of oil within the high pressure trunnion in a recycling path through large-diameter channels. This lowerage of temperature of the outer ring of the bearing journal brings about a considerable reduction in the clearance in the bearing journal during operation at maximum speeds, leading to a clear improvement in the lifespan of the bearing journal. Good results are assured through the use of low temperature oil for cooling. The oil comes from the bearing journal's oil supply system.

This result is improved still further by an advantageous feature of the invention in which the bearing journal's ventilating air, moving through a labyrinth seal carried by the inner ring of the roller bearing on the upstream side (with respect to the direction of circulation of gases in the turbine), passes through longitudinal grooves under the inner ring and crosses said inner ring through radial passages. In this manner, under conditions of rotation in which operating clearance appears, the inner ring is heated, which contributes to the reduction of clearance in the journal bearing.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 1 is an axial cross-sectional view of that portion of a multistage gas turbine in which the means for controlling clearance in an inter-shaft bearing journal as per the present invention are located;

FIG. 2 is a larger scale axial cross-sectional view of the means shown in FIG. 4;

FIG. 3 is a partial sectional view taken along line 3—3 of the means shown in FIG. 2;

FIG. 4 is a cross-sectional view taken along line 4—4 of FIG. 3;

FIG. 5 is a view of the means similar to the view shown in FIG. 2 but in axial cross-section in a different plane;

FIG. 6 is a partial sectional view along line 6—6 of the means shown in FIG. 2; and FIG. 7 is a view of the means similar to the view shown in FIG. 2 but showing an alternate embodiment of the invention.

DESCRIPTION OF THE PREFERRED EMBODIMENTS

FIG. 1 is a cross-sectional view of that portion of a multi-spool gas turbine in which are located a first shaft 1, which is the trunnion of the shaft line of the high pressure spool, and a second shaft 2, which is the trunnion of the shaft line of the low pressure spool. This second shaft 2 is carried in rotation by a roller bearing 4 in relation to a stationary journal box 3 connected to a housing of the gas turbine. At the end of this second shaft 2 and on an internal tube 5 is mounted a centrifugal oil distributor 6. This oil distributor 6 comprises an oil jet 7 and an internal ferrule 8 over which longitudinal partitions 9 form two sectors. Shaft 2 comprises an annular collector 10 and drill holes 11 in line with roller bearing 4, as well as another annular collector 12 adjacent to the first and connected through drill holes 13 provided in shaft 2 to a third annular collector 14 on the outer surface of shaft 2. Shaft 1 is also supported in rotation with respect to shaft 2 by an inter-shaft bearing journal 15 equipped with the clearance control means of the invention.

Bearing journal 15, shown in larger scale in FIGS. 2 through 6, comprises a roller bearing 16, of which the rollers 17 are inserted between an outer ring 18 and an inner ring 19. Rollers 17 roll between the races of said rings 18 and 19. Outer ring 18 is mounted directly onto first shaft 1, without the use of an intermediate casing, and is held there by means of a tightening nut 20 on the downstream side (with respect to the direction of circulation of gases within the turbine). This nut 20 has an annular recess 21. Inner ring 19 is set up on shaft 2 and includes radial drill holes 22 formed therein at the level of annular collector 14 disposed between shaft 2 and inner ring 19. At this same level, ring 19 further comprises longitudinal partitions 23 forming four sectors on the inner surface of ring 19. The sectors are laid out according to the representation given in FIG. 6, with two sectors 24 and two sectors 25.

Two sectors 24 correspond to radial drill holes 22 of ring 19, while sectors 25 communicate through longitudinal grooves 26 in shaft 2 with a fourth annular collector 27 at the surface of shaft 2 under inner ring 19 and in line with rollers 17 of the roller bearing. At the level of collector 27 and in a manner analogous to that described for collector 14 (but not shown in the drawings for collector 27), inner ring 19 comprises longitudinal partitions forming sectors. Some of those sectors correspond to radial drill holes 28 in ring 19, which extend from collector 27 toward the bearing surfaces of rollers 17.

As shown more clearly in FIG. 5, the inside of inner ring 19 also comprises longitudinal millings 29 corresponding to a second series of said sectors. Upstream and downstream radial passages 30,31 open respectively into upstream and downstream enclosures 32,33 of the roller bearing. Upstream end 34 (with respect to the direction of circulation of gases in the turbine) of inner ring 19 has a labyrinth seal 35 between said end 34 of inner ring 19 and a support piece 36 on the upstream side of outer ring 18. This support piece 36 closes upstream enclosure 32 of the roller bearing and, on the surface which makes contact with outer ring 18, comprises radial grooves 37.

In the zone lying along outer ring 18, bore 38 of high pressure trunnion 1 comprises a series of longitudinal grooves 39. In the embodiment shown, there are ten of these, each lunulate in shape. Such communicate with the outer, downstream enclosure 33 of the bearing journal through oblique drill holes 44. In the first embodiment according to the teachings of the invention, said bore 38 of high pressure trunnion 1 further comprises a second series of grooves 40, also lunulate in shape. The downstream ends of said grooves 40 communicate with drill holes 41 of tightening nut 20 of outer ring 18, which start from annular recess 21 in said nut 20. On the upstream side, said grooves 40 communicate through radial holes 42 with a series of parallel longitudinal drill holes 43. On their downstream side, these drill holes 43 open at the downstream end 45 of high pressure trunnion 1 into outer downstream enclosure 33 of the bearing journal.

In the second embodiment according to the teachings of the invention shown in FIG. 7, longitudinal drill holes 43a in high pressure trunnion 1 are oblique and inclined away from the axis of the turbojet engine, moving from upstream to downstream. In addition, grooves 40a, machined in bore 38 of high pressure trunnion 1, are disposed helically.

The operation of the clearance control means of the invention will now be set forth using the above-described embodiment of an inter-shaft bearing journal for a multi-spool gas turbine. The description of this mode of operation allows specification of some characteristics of the invention and pointing out of the advantages obtained.

Oil is supplied by centrifugal oil distributor 6 with jet 7. By centrifugation, said jet 7 sends oil over ferrule 8 of the oil distributor. Leaving oil distributor 6, the ring of oil is divided into two sectors by longitudinal partitions 9. Through drill holes (not shown), the oil arrives in first annular collector 10 and second annular collector 12. In this way, two oil supply circuits are created, for which the respective outputs are controlled. Distribution is ensured by virtue of said partitions 9 and by calibration of the drill holes. A circuit from first collector 10 supplies roller bearing 4 through drill holes 11 of low pressure trunnion 2 and thus lubricates and cools the said roller bearing 4. An oil circuit, from collector 12, performs two essential functions: such lubricates bearing journal 15 and cools roller bearing 16 and the oil constitutes the principal element used in the clearance control means of the multi-stage gas turbojet engine's inter-shaft bearing journal 15 in the embodiment conforming to the teachings of the invention.

In order to carry out these two function, the oil circuit subdivides at the level of inter-shaft bearing journal 15 into two circuits. In fact, collector 12 feeds drill holes 13 in low pressure trunnion 2, which lead into third annular collector 14. Here, longitudinal partitions 23 divide the oil into four sectors 24 and 25 which supply the following described circuits. In one circuit of inter-shaft bearing journal 15, oil is sent from sectors 25 through grooves 26 toward fourth collector 27. From here, through radial drill holes 28, the oil reaches the bearing surfaces of rollers 17 of roller bearing 16. By centrifugation, it then reaches outer ring 18 of the roller bearing, thus lubricating bearing journal 15 and cooling roller bearing journal 16. In a second circuit of inter-shaft bearing journal 15, oil moves by centrifugation from sectors 24 through radial drill holes 22 in lower roller bearing ring 19 and into annular recess 21 of nut 20. Through drill holes 41 in said nut 20, the oil enters the series of longitudinal 40 or helicoidal 40a grooves of high pressure trunnion 1. Through radial holes 42, the oil then circulates within said high pressure trunnion 1 in the series of longitudinal, parallel drillings 43 or oblique drillings 43a.

The embodiment providing for helically shaped grooves 40a in bore 38 of high pressure trunnion 1 has the advantage of reducing the stresses to which outer ring 18 is subjected with the passage of rollers 17. In addition, the embodiment providing oblique drill holes 43a makes possible better circulation of cooling oil by creating within said drill holes 43a a centrifugal field which dislodges the metallic particles and sludge which may be deposited there.

The oil which has circulated within high pressure trunnion 1, emerging at the outlet of drill holes 43, and that which moves from roller bearing 16 through radial grooves 37, longitudinal grooves 39, and oblique drill holes 44, is returned from outer downstream enclosure 33 of the bearing journal through passages 46 drilled into low pressure trunnion 2 toward recovery collectors in an outer enclosure 47, as shown in FIG. 1. From here, by known means, the oil moves toward the reservoir.

The clearance of the inter-shaft bearing journal is controlled by reduction of thermal expansion. At the maximum operating speeds of the turbine, the high pressure trunnion heats up considerably, while the temperature rise in the low pressure journal is much less great. Without the bearing journal clearance control means of the invention, the appearance of the excessive clearance which is so harmful to the mechanical maintenance of the inter-shaft bearing journal 15 is due to temperature variances existing between the outer part of the bearing journal 15, on the high pressure trunnion side, and the inner part of the bearing journal, on the side of the low pressure trunnion.

The circulation of cold oil within the high pressure trunnion, through channels which are of large diameter, have a relatively high rate of flow, and cover the entire width of the journal bearing, as in the means of the invention, results in a marked cooling of the high pressure trunnion, making it possible at the turbine's maximum operating speeds to reduce the temperature differences between the outer and inner parts of the inter-shaft bearing journal 15. This result is further reinforced by the advantageous complementary arrangement of the invention's for controlling the clearance in the inter-shaft bearing journal 15, in which air circulation is used as a second agent in said control. This air, which has a higher temperature than that of the inner part of the inter-shaft bearing journal 15 but which is used for cooling roller bearing 16 and the hot parts of bearing journal 15 (after seeping through upstream labyrinth seal 35), circulates across longitudinal millings 29 by passing through upstream 30 and downstream 31 radial passages. This air thus heats inner ring 19, which contributes to the reduction of clearance in the bearing journal 15 during those operating phases of the turbine in which the inner part of the bearing journal is cold in comparison to the outer part.

The bearing journal clearance control means described herein in a particular embodiment are naturally open to numerous other applications and various embodiments within reach of persons skilled in the art. Among these variants, which will not be shown or described in detail, the following will be noted: Labyrinth seal 35 may be held by an upstream tightening nut for the inner ring of the roller bearing, said ring being possibly contained in an inner bearing casing. The roller bearing may be contained in an outer bearing casing, with oil circulating within it, perhaps in combination with the oil circulating in the external shaft.

In the latter embodiment, the oil lubricating the roller bearing may be returned through said outer casing.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A clearance control device in an inter-shaft bearing journal of a multi-spool turbojet engine, comprising:
   means for feeding cold oil;
   a first outer shaft which further comprises a high pressure trunnion of a shaft line of a high pressure spool, and including a bore and a first series of longitudinal holes and a second series of radial holes formed therein;
   a second, inner shaft which further comprises a low pressure trunnion of a shaft line of a lower pressure stage wherein said high pressure trunnion revolves in relation to said low pressure trunnion;
   an outer ring mounted directly on the first shaft;
   an inner ring mounted upon the second shaft; and
   a roller bearing mounted so as to be disposed between said first and second shaft and wherein said longitudinal holes of said high pressure trunnion have a length at least equal to the width of said outer ring and wherein said bore of said high pressure trunnion includes a series of grooves formed therein which communicate with said cold oil feeding means and via said radial holes with said series of longitudinal holes and within which the cooling oil circulates.

2. A clearance control device in an inter-shaft bearing journal according to claim 1, wherein the longitudinal holes of the high pressure trunnion are inclined obliquely away from the axis of the turbojet engine in a direction for circulation of oil downstream.

3. A clearance control device in an inter-shaft bearing journal according to claim 1, wherein the longitudinal holes of the high pressure trunnion are disposed parallel to the axis of the turbojet engine.

4. A clearance control device in an inter-shaft bearing journal according to claims 1, 2 or 3 wherein the grooves further comprise longitudinal grooves which are parallel to the axis of the turbine.

5. A clearance control device in an inter-shaft bearing journal according to claims 1, 2 or 3, wherein the grooves further comprise helically shaped grooves.

6. A clearance control device in an inter-shaft bearing journal according to claims 1, 2 or 3 wherein said roller bearing further comprises an inner ring having a plurality of longitudinal grooves and an upstream and downstream radial passage formed therein and further comprising a labyrinth seal carried on said inner ring of the roller bearing on an upstream side of said turbojet engine and further comprising:
   means for ventilating air of the bearing journal through said labyrinth seal across said inner ring through said upstream and downstream radial passages such that said lower roller bearing ring is heated during operating phases of the turbine at maximum speeds.

7. A clearance control device in an inter-shaft bearing journal according to claims 1, 2 or 3 wherein said low pressure trunnion includes a first and second plurality of holes formed therein and further comprising:
   a first annular collector, located on said low pressure trunnion;
   a second annular collector located adjacent said first annular collector on said low pressure trunnion;
   a third annular collector located at the level of the inter-shaft bearing journal;
   a roller bearing carrying said low pressure trunnion wherein said inner ring of the roller bearing includes a plurality of radial holes formed therein and said outer ring of the bearing further comprises a downstream tightening nut having an annular recess and a plurality of holes formed therein;
   a centrifugal oil distributor mounted on a downstream end of the low pressure trunnion including a ferrule;
   a jet operatively associated with said bearing journal for dstributing said cold oil, said jet including a plurality of longitudinal partitions operatively associated therewith wherein said jet distributes said cold oil through the grooves and the series of holes of the high pressure trunnion and communicates said oil over said ferrule of said centrifugal oil distributor wherein a ring of oil so distributed is divided into first and second circuits by means of said longitudinal partitions, said first circuits supplying said roller bearing carrying the low pressure trunnion from said first annular collector located on said low pressure trunnion through said first plurality of holes formed in said low pressure trunnion, and said second circuit which, from said second annular collector adjacent the first annular collector on the low pressure trunnion and through said second plurality of holes in the low pressure trunnion, supplies said third annular collector, from which point a portion of the oil moves by centrifugation through said radial holes formed in the inner ring of the roller bearing towards said annular recess in the downstream tightening nut of the outer ring of the bearing, supplying said grooves and said holes of the high pressure trunnion through said holes in said nut.

8. A clearance control device in an inter-shaft bearing journal according to claim 7, wherein said low pressure trunnion further comprises a plurality of longitudinal grooves formed therein, said bearing journal further comprises a roller bearing with rollers and said inner ring has a plurality of radial holes formed therein and further comprising a fourth collector located under the inner ring on the low pressure trunnion and a lubrication circuit mounted for the inter-shaft bearing and wherein the third annular collector further comprises a plurality of longitudinal partitions provided in said inner ring for dividing oil between supplying the high pressure trunnion and supplying said lubrication circuit for the inter-shaft bearing, and which oil is communicated through said longitudinal grooves from the lower pressure trunnion into said fourth collector, from which point said oil reaches said rollers through the radial holes of the inner ring, and, by centrifugation, the outer ring of the roller bearing.

9. A clearance device in an inter-shaft bearing journal according to claims 1, 2 or 3, further comprising a recovery chamber and passage means formed in the low pressure trunnion such that, upon leaving the longitudinal holes of the high pressure trunnion and upon leaving the channels which collect lubricating oil of the bearing journal on the bore of the high pressure trunnion, the oil returns downstream of said recovery chamber.

* * * * *

UNITED STATES PATENT AND TRADEMARK OFFICE
CERTIFICATE OF CORRECTION

PATENT NO. : 4,500,143

DATED : February 19, 1985

INVENTOR(S) : KERVISTIN ET AL

It is certified that error appears in the above-identified patent and that said Letters Patent is hereby corrected as shown below:

Abstract, line 17, change "the bearing and cools" to --the bearing journal--.

Column 1, line 18, change "high pressure stage" to --high pressure spool--.

Column 2, line 13, change "spool line" to --shaft line--.

Signed and Sealed this

Fifteenth Day of October 1985

[SEAL]

Attest:

DONALD J. QUIGG

Attesting Officer

Commissioner of Patents and Trademarks—Designate